Jan. 27, 1959
H. G. KOSER
2,870,984
SILO CONSTRUCTION
Filed June 2, 1954
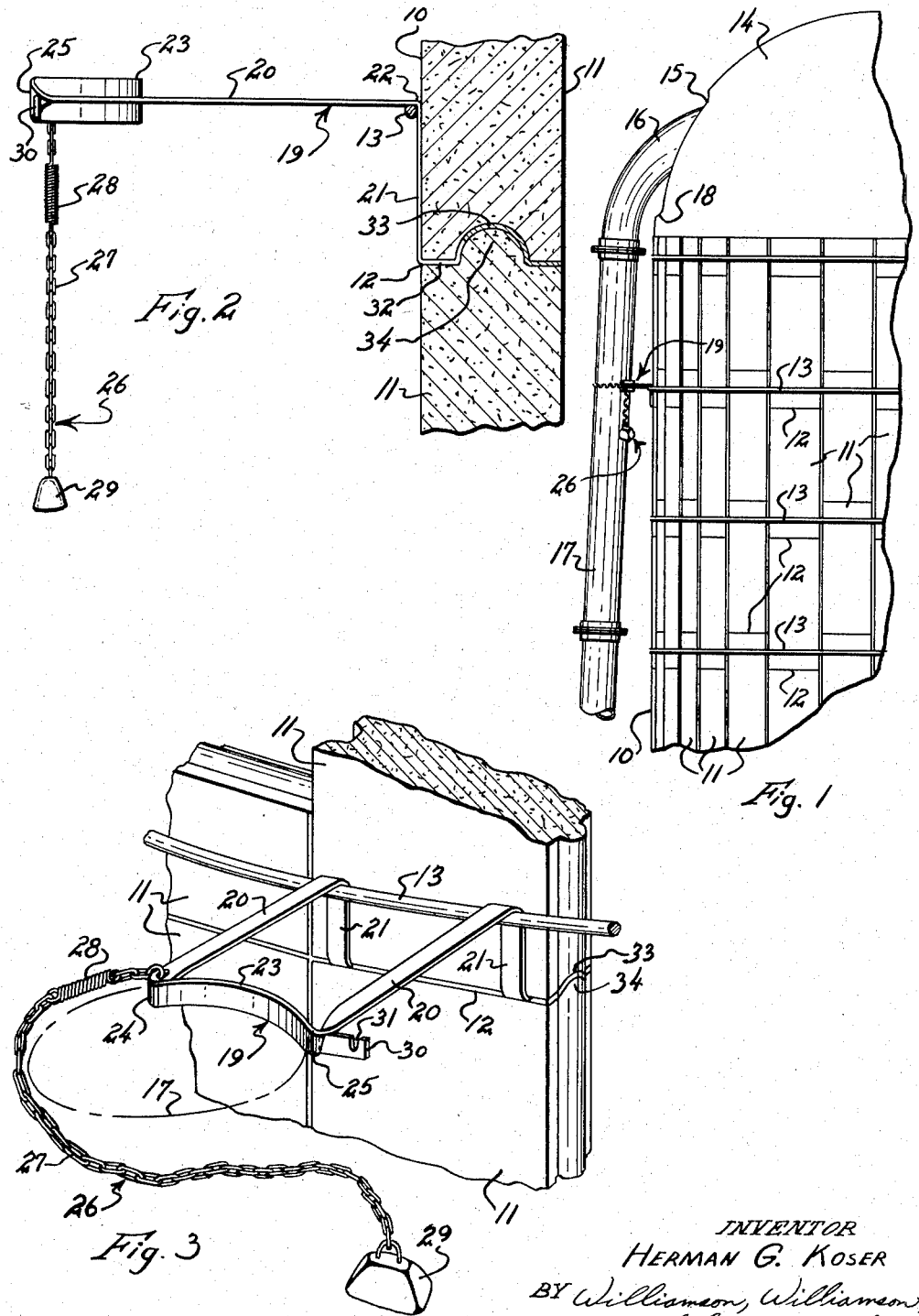
INVENTOR
HERMAN G. KOSER
BY Williamson, Williamson,
Schroeder & Adams
ATTORNEYS

United States Patent Office 2,870,984
Patented Jan. 27, 1959

2,870,984

SILO CONSTRUCTION

Herman G. Koser, Almena, Wis.

Application June 2, 1954, Serial No. 434,002

2 Claims. (Cl. 248—229)

The invention relates to a silo construction and more particularly to a silo with a bracket device for retaining and positioning a conventional blower pipe during cutting of ensilage and filling of the silo.

It has been customary in the case of vertical silos to fill them with ensilage by blowing the cut material through a pipe at the same time that the material is cut. The equipment provided has a long upright tube or pipe terminating in a curved spout which is adapted to be received at the top of the silo through an opening therein. Since the silo is high, the blowing tube or pipe is long and receives its only support from contact with the silo top. Sometimes additional stability may be obtained through means of guy wires which are independently secured to the apparatus but do not form a part of the silo itself. The blowing pipe or tube if unsupported may buckle or fall during handling and endanger the lives of persons in the vicinity as well as the equipment and silo itself. Even where the blower pipe is supported by guy wires, it may be easily damaged, especially in windy weather.

It is therefore an important object of this invention to provide a silo construction which will permit conventional filling at a high vertical position while efficiently holding in firm relation against damage, the blower tube.

Another object is to provide a bracket device which will be inexpensive and simple to make and to incorporate with a silo, yet which will insure against accidental displacement and damage resulting therefrom.

A further object of the invention is to provide a silo construction which has means for retaining a blower tube, said means being secured in permanent relation with the silo for proper alignment and holding of the blower tube.

A still further object of the invention is to provide a simple device of the class described which may be attached to the outer wall of a conventional silo and which may be simply and quickly placed in firm supporting relation with an ensilage blower tube for preventing damage to the blowing equipment and to the property and preventing injury to persons near the silo.

These and other objects and advantages of the invention will more fully appear from the following description made in connection with the accompanying drawings, wherein like reference characters refer to the same or similar parts throughout the several views, and in which:

Fig. 1 is a side view of the upper portion of a conventional silo to which is attached my bracket device and holding in position a conventional ensilage blower tube, unessential portions of the invention being cut away;

Fig. 2 is an enlarged view of the bracket device attached to a silo, a vertical section of which is shown in segment; and Fig. 3 is an enlarged detail of my silo construction showing the construction of the bracket member and its cooperation with the slab and band structure of the silo, unessential portions being cut away.

Referring now more particularly to the drawing, Fig. 1 shows a conventional silo construction wherein the silo wall 10 is made up of vertical slab units 11, usually of tile or concrete structure. The slab units 11 have horizontal edges 12 which form edge junctions in staggered relation with a brace or band 13 which is in tight encircling relation with the slabs or staves 11. The band 13 is adapted to lie between the staggered edge junctions 12 as shown in Fig. 1. The silo construction may have a plurality of layers of said staves or slabs 11, the junctions between them lying generally in a circumferential staggered pattern with a circumferential rod lying therebetween in each instance. The conventional silo has a top 14 to keep the elements away from the upper open end of the silo and has further a doorway or opening 15 for receiving the spout 16 of a blower tube or pipe 17. The blower tube spout 16 is generally adapted to lie in supported relation with top 14 at the lower edge 18 of the opening 15.

In the present invention, a silo construction is contemplated which will include one or more bracket members for supporting the blower tube or pipe 17 and without requiring independent guy wires or other supporting means. The device comprises an L-shaped support indicated generally at 19 and having outwardly extending arms 20 and downwardly depending legs 21 as shown. The junction of the arms and legs forms a right angled bend at 22 which is adapted to lie in gripped relation behind the encircling band 13 with the depending legs 21 in contact against the outer wall 10 as shown in Fig. 2.

A cradle element 23 is rigidly secured to the outwardly extending portion of the L-shaped support 19 and is preferably arranged in an arcuate band lying in a general horizontal plane and having one outer end 24 secured to one of said outwardly extending arms 20 and the other end 25 of the arcuate cradle 23 being secured to the other of said outwardly extending arms 20 as shown in Fig. 3.

Fastening means 26 comprises an elongated flexible holder which is attached to the end 24 of the arcuate cradle and preferably comprises a chain member 27 which has interposed between its ends a resilient member 28 preferably in the form of a tension spring. The other end of the chain 27 has secured thereto a weight 29 which is adapted to hold the elongated resilient chain member in depending relation during use. The pipe or tube 17 is adapted to lie in abutting relation within the arcuate cradle 23 with the chain 27 secured tightly thereagainst and with one of the chain links attached to the other end 25 of the arcuate cradle 23. It is preferred to form a flange member 30 to the cradle end 25 and to form in said flange an upwardly extending notch 31 for receiving one of said chain links. The pipe or tube 17 of the ensilage cutting and blowing equipment is secured against the arcuate cradle 23 as shown in Fig. 1, and the chain 27 is wrapped around the pipe 17 with a slight amount of tension placed on spring 28. The appropriate link in chain 27 is then secured in the notch 31 with the weight 29 remaining in depending position as shown in Fig. 1. The weight 29 prevents the chain from working loose even under conditions of vibration in the equipment and in a windy atmosphere.

In order to make the bracket member still more secure, I prefer to form an inturned end 32 on each of the depending legs 21 and to space the inturned ends 32 such that the distance from the bend 22 in contact with circumferential band 13 down to the appropriate junction 12, will effect a registry of the inturned end 32 with the junction. Since the usual construction of the individual slab members provides a groove 33 in the lower edge of the upper slab 11 which interfits with a tongue member 34 in the upper edge of the lower slab 11, I may utilize this arrangement for gripping in secure relation the inturned end 32 of each of legs 21.

My bracket member may be attached and secured to a standard silo of the construction described during the building thereof, or may be attached to a silo which is already built by loosening an appropriate encircling band 13 and inserting an inturned end between the appropriate slabs. In such case, it may be necessary to widen the space between the slabs for inserting the inturned end. Most of the pressure on the legs, however, is in a counterclockwise direction as viewed in Fig. 2 and the bracket member will remain in firmly supported relation when the band 13 is again tightened against the L-shaped bend.

It may thus be seen that I have devised a simple bracket in silo construction which will eliminate the necessity for external guy wires and other supports while still maintaining the blower tube in safe and secure relation with the silo during the filling thereof.

It will, of course, be understood that various changes may be made in the form, details, arrangement and proportions of the various parts without departing from the scope of my invention.

What I claim is:

1. A blower tube mounting for attachment to a conventional silo, said mounting comprising, a cradle element for receiving an ensilage blower tube in abutting relation against lateral displacement, an L-shaped support having a laterally extending portion secured at its outer end to said cradle element and having an inner upstanding portion adapted to be held against the silo wall by said band, and elongated flexible holder secured at one side of the cradle element and adapted to closely encircle a blower tube, said flexible holder being securable at the other side of the cradle to hold the tube in rigid spaced relation with the silo and a band encompassing the silo and holding the inner upstanding portion of the support against the silo, said inner portion projecting downwardly from the band.

2. A blower tube mounting for attachment to a conventional silo, said mounting comprising bracket means defining a vertically oriented tube cradle having releasable means for attaching the tube thereto, said bracket means also including rigid vertical legs to lie against the outer side of the silo, a rigid band encompassing the silo and overlying said vertical legs adjacent the upper ends thereof, downwardly facing abutment means on the upper ends of said legs and engaging the band to retain the legs in underlying relation with respect to the band, and means connecting said cradle with the vertical legs and spacing the cradle outwardly from the legs and from the band.

References Cited in the file of this patent

UNITED STATES PATENTS

| | | |
|---|---|---|
| 71,941 | Ahn | Dec. 10, 1867 |
| 555,358 | Balsley | Feb. 25, 1896 |
| 794,645 | Springen | July 11, 1905 |
| 1,018,675 | Mueller et al. | Feb. 27, 1912 |
| 1,208,345 | McGaffee | Dec. 12, 1916 |
| 1,528,712 | Ward | Mar. 3, 1925 |
| 2,105,145 | Gurney | Jan. 11, 1938 |

FOREIGN PATENTS

| | | |
|---|---|---|
| 643,478 | France | Sept. 18, 1928 |